(No Model.)
F. KAMPF.
RECEPTACLE FOR PULVERIZED SUBSTANCES.
No. 400,686. Patented Apr. 2, 1889.
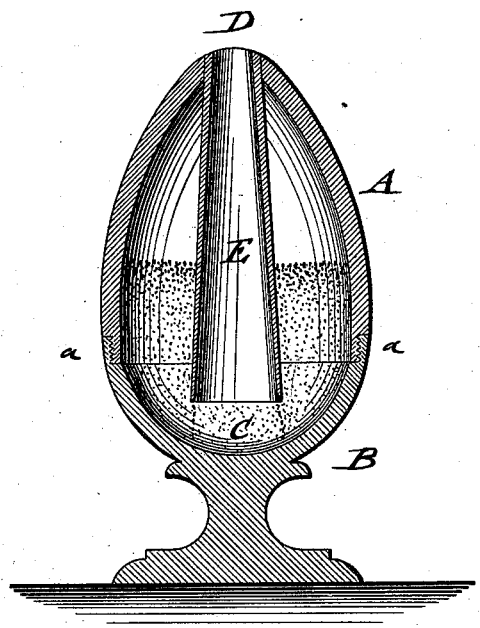
WITNESSES:
INVENTOR
Ferdinand Kampf
BY
ATTORNEYS.

UNITED STATES PATENT OFFICE.

FERDINAND KAMPF, OF CHEMNITZ, GERMANY.

RECEPTACLE FOR PULVERIZED SUBSTANCES.

SPECIFICATION forming part of Letters Patent No. 400,686, dated April 2, 1889.

Application filed August 17, 1888. Serial No. 283,015. (No model.)

*To all whom it may concern:*

Be it known that I, FERDINAND KAMPF, of Chemnitz, in the Empire of Germany, have invented certain new and useful Improvements in Receptacles for Pulverized Substances, of which the following is a specification.

This invention relates to improved receptacles for dry pulverized condiments, and the object of my invention is to provide a receptacle of such kind that when it is inverted only a certain quantity of the dry pulverized condiments pours out of the outlet-opening.

The invention consists of a receptacle having an interior tube extending from the top opening nearly to the bottom of said receptacle for the purpose of allowing a definite quantity of the material to be ejected at one movement.

In the accompanying drawing a vertical transverse sectional view of my improved receptacle for dry pulverized condiments is shown.

The receptacle A, which may have any desired suitable shape, and which may be made of any desired suitable material, is secured on the base B. The top of the base has a recess or cavity, C, and the inner surface of the walls of the receptacle are inclined toward said recess or cavity C, so that the same will at all times be filled. From the top central opening, D, of the receptacle A the tube E extends downward to within a short distance from the central part of the top of the base, and said tube is flared toward its lower end. When the receptacle and base are inverted, only that quantity of dry pulverized condiments in the recess or central part of the top of the base passes through the tube E and out through the opening D, the remainder passing into the front or top part of the receptacle and being retained between the outer sides of the tube E and the walls of the receptacle.

Having thus described my invention, I claim as new and desire to secure by Letters Patent—

A receptacle for dry pulverized condiments, having an interior tube extending from the top opening of the receptacle nearly to the bottom of said receptacle, for the purpose of allowing a definite quantity of the condiments to be ejected at one movement, substantially as herein shown and described.

In testimony that I claim the foregoing as my invention I have signed my name in presence of two subscribing witnesses.

FERDINAND KAMPF.

Witnesses:
BENNO JOHANNES SCHMIDT,
EMIL RUDOLPH KOCH.